US012754318B2

(12) United States Patent
Ghannam et al.

(10) Patent No.: US 12,754,318 B2
(45) Date of Patent: Oct. 6, 2026

(54) SYSTEMS AND METHODS FOR IN-CABIN MONITORING WITH LIVELINESS DETECTION

(71) Applicant: Ford Global Technologies, LLC, Dearborn, MI (US)

(72) Inventors: Mahmoud Yousef Ghannam, Canton, MI (US); Heba Abdallah, Dearborn Heights, MI (US); Ryan Joseph Gorski, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 18/122,286

(22) Filed: Mar. 16, 2023

(65) Prior Publication Data

US 2024/0310523 A1 Sep. 19, 2024

(51) Int. Cl.
*G01S 17/89* (2020.01)
*B60R 21/015* (2006.01)
(Continued)

(52) U.S. Cl.
CPC ........ *G01S 17/89* (2013.01); *B60R 21/01542* (2014.10); *B60R 25/01* (2013.01);
(Continued)

(58) Field of Classification Search
CPC . G01S 17/89; G01S 7/4865; B60R 21/01542; B60R 25/01; E05F 15/73;
(Continued)

(56) References Cited

U.S. PATENT DOCUMENTS

| | | | |
|---|---|---|---|
| 9,671,492 B2 | 6/2017 | Diewald | |
| 10,744,967 B2 | 8/2020 | Lee et al. | |

(Continued)

FOREIGN PATENT DOCUMENTS

| | | | |
|---|---|---|---|
| DE | 102021001374 A1 * | 4/2021 | .......... B60W 50/082 |
| JP | 2022111156 A | 7/2022 | |

OTHER PUBLICATIONS

DE102021001374A1 EPO Translation of Claims with Claim Numbers (Year: 2021).*

(Continued)

*Primary Examiner* — Rachid Bendidi

(74) *Attorney, Agent, or Firm* — Frank Lollo; Carlson, Gaskey & Olds, P.C.

(57) ABSTRACT

A method for monitoring an object in a compartment of a vehicle. The method includes generating, via a time-of-flight sensor, a point cloud representing the compartment of the vehicle. The point cloud includes three-dimensional positional information of the compartment. The method further includes determining, via processing circuitry in communication to the time-of-flight sensor, a shape of the object based on the point cloud. The method further includes classifying the object as an occupant based on the shape. The method further includes identifying a body segment of the occupant. The method further includes comparing the body segment to target keypoints corresponding to a target attribute for the body segment. The method further includes determining a condition of the occupant based on the comparison of the body segment to the target keypoints. The method further includes generating an output based on the determined condition.

26 Claims, 10 Drawing Sheets

(51) Int. Cl.

| | |
|---|---|
| ***B60R 25/01*** | (2013.01) |
| ***E05F 15/73*** | (2015.01) |
| ***G01S 7/4865*** | (2020.01) |

(52) U.S. Cl.

CPC ............ *E05F 15/73* (2015.01); *G01S 7/4865* (2013.01); *E05F 2015/765* (2015.01); *E05Y 2400/44* (2013.01); *E05Y 2400/45* (2013.01); *E05Y 2400/858* (2013.01); *E05Y 2900/55* (2013.01)

(58) Field of Classification Search

CPC ........... E05F 2015/765; E05Y 2400/44; E05Y 2400/45; E05Y 2400/858; E05Y 2900/55

See application file for complete search history.

(56) References Cited

U.S. PATENT DOCUMENTS

| | | | | |
|---|---|---|---|---|
| 2018/0251122 | A1* | 9/2018 | Golston | B60W 40/08 |
| 2019/0123508 | A1* | 4/2019 | Hong | G01S 7/4816 |
| 2020/0294266 | A1* | 9/2020 | Botonjic | G01S 17/89 |
| 2021/0081689 | A1* | 3/2021 | Weyers | G06F 18/253 |
| 2021/0179117 | A1* | 6/2021 | Glazman | B60R 21/0136 |
| 2021/0342611 | A1 | 11/2021 | Kale et al. | |
| 2021/0402942 | A1* | 12/2021 | Torabi | B60W 50/14 |
| 2022/0172475 | A1* | 6/2022 | Hayman | G06T 17/05 |
| 2022/0256123 | A1 | 8/2022 | Parenti et al. | |
| 2023/0071443 | A1* | 3/2023 | Dimitrov | G01S 17/87 |
| 2023/0356682 | A1* | 11/2023 | Kurapati | B60R 21/01552 |

OTHER PUBLICATIONS

DE102021001374A1 EPO Translation of Description with Paragraph Numbers (Year: 2021).*

Hsu, Ching-Pai; "A Review and Perspective on Optical Phased Array for Automotive LiDAR"; first disseminated Sep. 9, 2020; IEEE; "IEEE Journal of Selected Topics in Quantum Electronics" (vol. 27, No. 1, pp. 1-16, Jan.-Feb. 2021); DOI 10.1109/JSTQE.2020.3022948 (Year: 2020).*

C.-P. Hsu et al., "A Review and Perspective on Optical Phased Array for Automotive LiDAR," in IEEE Journal of Selected Topics in Quantum Electronics, vol. 27, No. 1, pp. 1-16, Jan.-Feb. 2021 (Year: 2021).*

* cited by examiner

Points

124a - Skull Base
124b - Neck
124c - Torso Top
124d - Torso Middle
124e - Torso Base
124f - Right Shoulder
124g - Right Elbow
124h - Right Wrist
124i - Left Shoulder
124j - Left Elbow
124k - Left Wrist
124l - Right Hip
124m - Right Knee
124n - Right Ankle
124o - Right Mid Foot
124p - Left Hip
124q - Left Knee
124r - Left Ankle
124s - Left Mid Foot Features 124t - Center of Head
124u - Right Eye
124v - Left Eye
124w - Right Ear
124x - Left Ear
124y - Nose
124z - Chest Center

SYSTEMS AND METHODS FOR IN-CABIN MONITORING WITH LIVELINESS DETECTION

FIELD OF THE DISCLOSURE

The present disclosure generally relates to systems and methods for in-cabin monitoring with liveliness detection and, more particularly, to occupant monitoring using three-dimensional positional information to detect conditions of an occupant.

BACKGROUND OF THE DISCLOSURE

Conventional monitoring techniques are typically based on visual image data. A detection system that captures depth information may enhance spatial determination.

SUMMARY OF THE DISCLOSURE

According to a first aspect of the present disclosure, a method for monitoring an object in a compartment of a vehicle. The method includes generating, via a time-of-flight sensor, a point cloud representing the compartment of the vehicle. The point cloud includes three-dimensional positional information of the compartment. The method further includes determining, via processing circuitry in communication to the time-of-flight sensor, a shape of the object based on the point cloud. The method further includes classifying the object as an occupant based on the shape. The method further includes identifying a body segment of the occupant. The method further includes comparing the body segment to target keypoints corresponding to a target attribute for the body segment. The method further includes determining a condition of the occupant based on the comparison of the body segment to the target keypoints. The method further includes generating an output based on the determined condition.

Embodiments of the first aspect of the present disclosure can include any one or a combination of the following features:

- the time-of-flight sensor includes a LiDAR module configured to detect light having a wavelength of at least 1500 nm;
- determining whether the occupant has limited movement of the body segment;
- capturing the point cloud at a plurality of instances, comparing the plurality of instances, and determining six degrees of freedom of a movement of the body segment based on the point cloud;
- determining a restriction of at least one of the six degrees of freedom based on the comparison of the plurality of instances;
- communicating, via the processing circuitry to a window control system of the vehicle, a signal to adjust a window to open or close the window based on detection of the condition;
- presenting, at a user interface in communication with the processing circuitry, an option for the occupant to select the condition;
- adjusting the target keypoints based on the option selected;
- classifying, by the processing circuitry, the occupant as a human child, a human adult, or an animal based on the shape;
- determining a pose of the occupant based on the three-dimensional positional information, comparing, via the processing circuitry, the pose to body pose data stored in a database in communication with the processing circuitry, and determining an unfocused state of the occupant based on the comparison of the pose to the body pose data; and
- communicating, via the processing circuitry to an operational system of the vehicle, a signal to adjust an operation of the vehicle based on detection of the unfocused state.

According to a second aspect of the present disclosure, a system for monitoring an object in a compartment of a vehicle. The system includes a time-of-flight sensor configured to generate a point cloud representing the compartment of the vehicle. The point cloud includes three-dimensional positional information of the compartment. The system further includes processing circuitry in communication with the time-of-flight sensor. The processing circuitry is configured to determine a shape of the object based on the three-dimensional positional information, classify the object as an occupant based on the shape, identify a body segment of the occupant, compare the body segment to target keypoints corresponding to a target attribute for the body segment, determine an abnormality of the occupant based on the comparison of the body segment to the target keypoints, and generate an output based on the determined condition.

Embodiments of the second aspect of the present disclosure can include any one or a combination of the following features:

- determine whether the occupant has limited movement of the body segment;
- capture the point cloud at a plurality of instances, compare the plurality of instances, and determine six degrees of freedom of a movement of the body segment based on the point cloud; and
- determine a restriction of at least one of the six degrees of freedom based on the comparison of the plurality of instances.

According to a third aspect of the present disclosure, a system for monitoring an object in a compartment of a vehicle. The system includes a LiDAR module configured to generate a point cloud representing the compartment of the vehicle. The point cloud includes three-dimensional positional information of the compartment. The method further includes a processing circuitry in communication with the LiDAR module. The processing circuitry is configured to determine a shape of the object based on the three-dimensional positional information, classify the object as an occupant based on the shape, identify a body segment of the occupant based on the point cloud, compare the body segment to target keypoints corresponding to a target attribute for the body segment, determine a condition of the occupant based on the comparison of the body segment to the target keypoints; and generate an output based on the determined condition.

Embodiments of the third aspect of the present disclosure can include any one or a combination of the following features:

- determine whether the occupant has limited movement of the body segment;
- capture the point cloud at a plurality of instances, compare the plurality of instances, and determine six degrees of freedom of a movement of the body segment based on the point cloud;
- determine a restriction of at least one of the six degrees of freedom based on the comparison of the plurality of instances; and a window control system in communication with the processing circuitry, the processing circuitry is further configured to communicate a signal to adjust a window of the window control system to open or close the window based on detection of the condition.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1A:
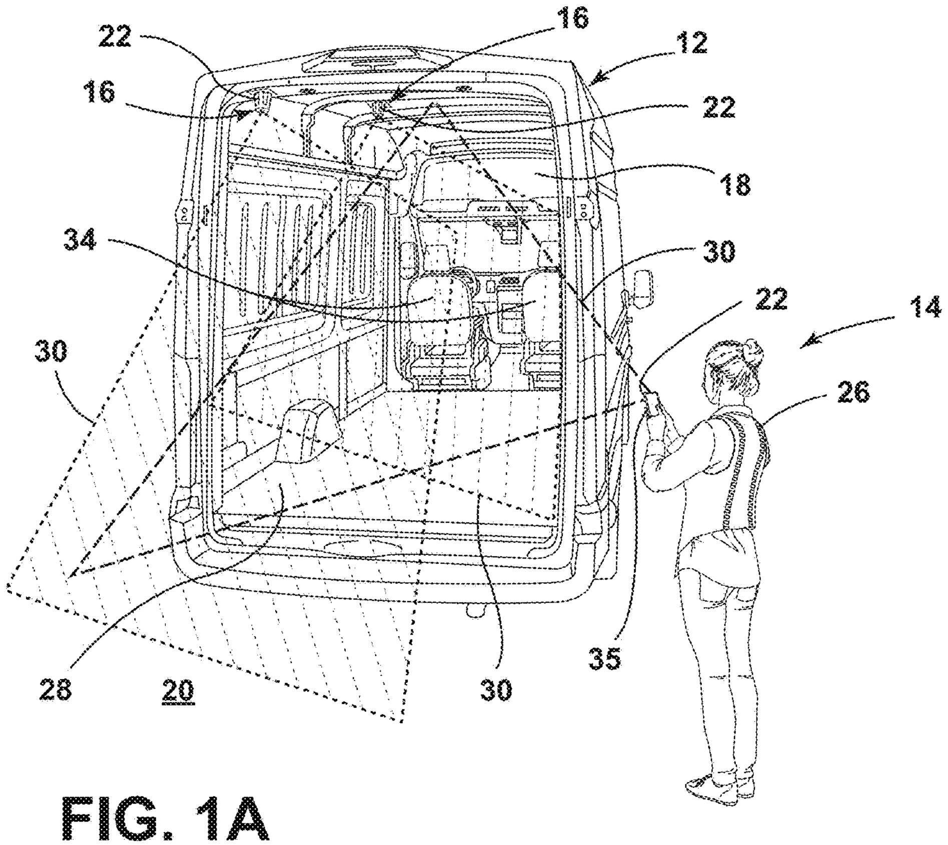
FIG. 1A is a perspective view of a cargo van incorporating a detection system of the present disclosure in a rear space of the cargo van.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to in-cabin monitoring with liveliness detection. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1A-5, the present disclosure generally relates to a detection system 10 for a vehicle 12 that utilizes three-dimensional image sensing to detect information about an environment 14 in or around the vehicle 12. The three-dimensional image sensing may be accomplished via one or more time-of-flight (ToF) sensors 16 that are configured to map a three-dimensional space such as an interior 18 of the vehicle 12 and/or a region exterior 20 to the vehicle 12. For example, the one or more time-of-flight sensors 16 may include at least one light detection and ranging (LiDAR) module 22 configured to output pulses of light, measure a time of flight for the pulses of light to return from the environment 14 to the at least one LiDAR module 22, and generate at least one point cloud 24 of the environment 14 based on the time-of-flight of the pulses of light. In this way, the LiDAR module 22 may provide information regarding three-dimensional shapes of the environment 14 being scanned, including geometries, proportions, or other measurement information related to the environment 14 and/or occupants 26 for the vehicle 12.

The LiDAR modules 22 of the present disclosure may operate conceptually similar to a still frame or video stream, but instead of producing a flat image with contrast and color, the LiDAR module 22 may provide information regarding three-dimensional shapes of the environment 14 being scanned. Using time-of-flight, the LiDAR modules 22 are configured to measure the round-trip time taken for light to be transmitted, reflected from a surface, and received at a sensor near the transmission source. The light transmitted may be a laser pulse. The light may be sent and received millions of times per second at various angles to produce a matrix of the reflected light points. The result is a single measurement point for each transmission and reflection representing distance and a coordinate for each measurement point. When the LiDAR module 22 scans the entire "frame," or field of view 30, it generates an output known as a point cloud 24 that is a 3D representation of the features scanned.

In some examples, the LiDAR modules 22 of the present disclosure may be configured to capture the at least one point cloud 24 independent of visible-light illumination of the environment 14. For example, the LiDAR modules 22 may not require ambient light to achieve the spatial mapping techniques of the present disclosure. For example, the LiDAR module 22 may emit and receive IR or near-infrared (NIR) light, and therefore generate the at least one point cloud 24 despite visible-light conditions. Further, as compared to Radio Detection and Ranging (RADAR), the depth-mapping achieved by the LiDAR modules 22 may have greater accuracy due to the rate at which the LiDAR pulses may be emitted and received (e.g., the speed of light). Further, the three-dimensional mapping may be achieved without utilizing radio frequencies (RF), and therefore may limit RF certifications for operation. Accordingly, sensors incorporated for monitoring frequencies and magnitudes of RF fields may be omitted by providing the present LiDAR modules 22.

Figure 1B:
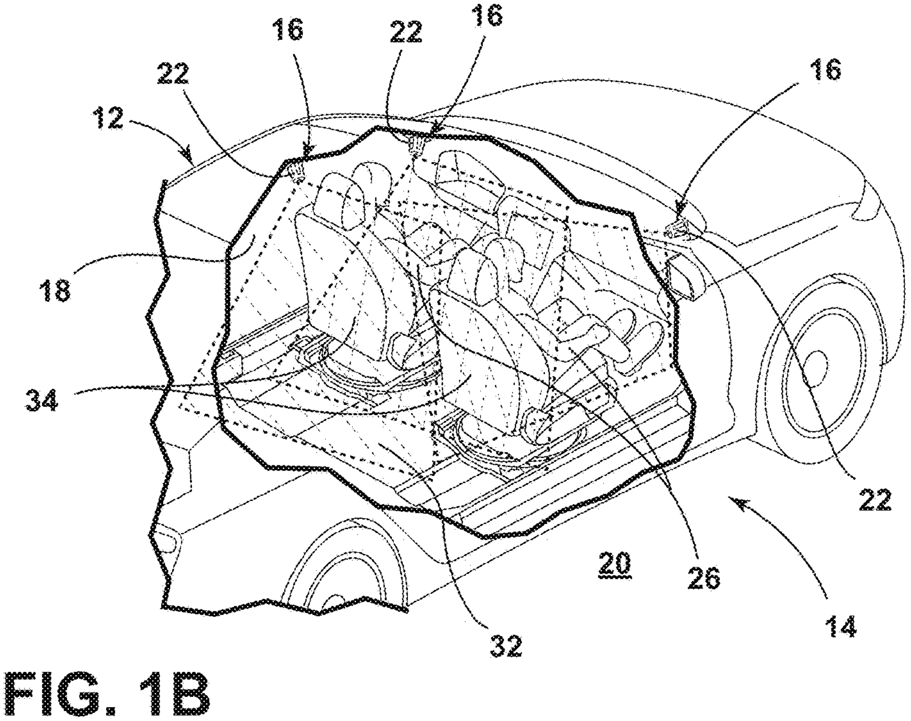
FIG. 1B is a perspective view of a car incorporating a detection system of the present disclosure in a passenger cabin of the car.

Referring now more particularly to FIGS. 1A and 1B, a plurality of the LiDAR modules 22 may be configured to monitor a compartment 28 of the vehicle 12. In the example illustrated in FIG. 1A, the LiDAR modules 22 are configured with a field of view 30 that covers the rear space of the vehicle 12, as well as the region exterior 20 to the vehicle 12. In this example, the region exterior 20 to the vehicle 12 is a space behind the vehicle 12 adjacent to an entry or an exit to the vehicle 12. In FIG. 1B, the plurality of LiDAR modules 22 are configured to monitor a front space of the vehicle 12, with the field of view 30 of one or more of the plurality of LiDAR modules 22 covering a passenger cabin 32 of the vehicle 12. As will be described further herein, it is contemplated that the plurality of LiDAR modules 22 may be in communication with one another to allow the at least one point cloud 24 captured from each LiDAR module 22 to be compared to one another to render a greater-accuracy representation of the environment 14. For example, and as depicted in FIG. 1A, the occupant 26 or another user may direct a mobile device 35 toward the environment 14 to generate an additional point cloud 24 from a viewing angle different than the field-of-views 30 of the LiDAR modules 22 of the vehicle 12. For example, the mobile device 35 may be a cellular phone having one of the LiDAR modules 22. In general, the time-of-flight sensors 16 disclosed herein may capture point clouds 24 of various features of the environment 14, such as seats 34, occupants 26, and various other surfaces or items present in the interior 18 or the region exterior 20 to the vehicle 12. As will further be discussed herein, the present system 10 may be operable to identify these features based on the at least one point cloud 24 and make determinations and/or calculations based on the identities, spatio-temporal positions of the features, and/or other related aspects of the features detected in the at least one point cloud 24.

Figure 2A:
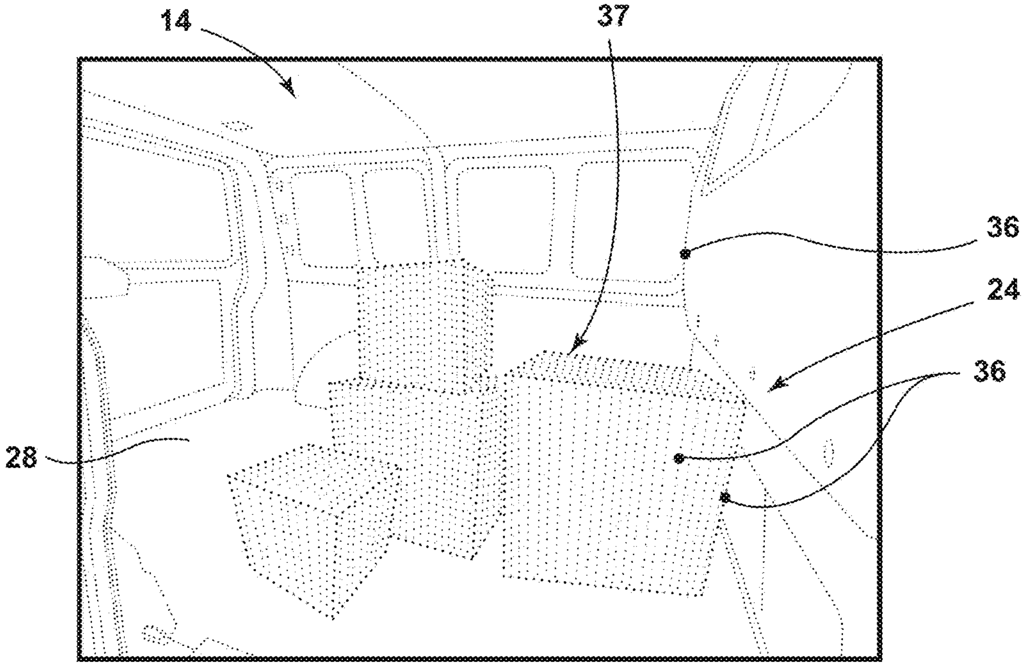
FIG. 2A is a representation of a point cloud generated by a time-of-flight sensor configured to monitor a rear space of a cargo van of the present disclosure.
Figure 2B:
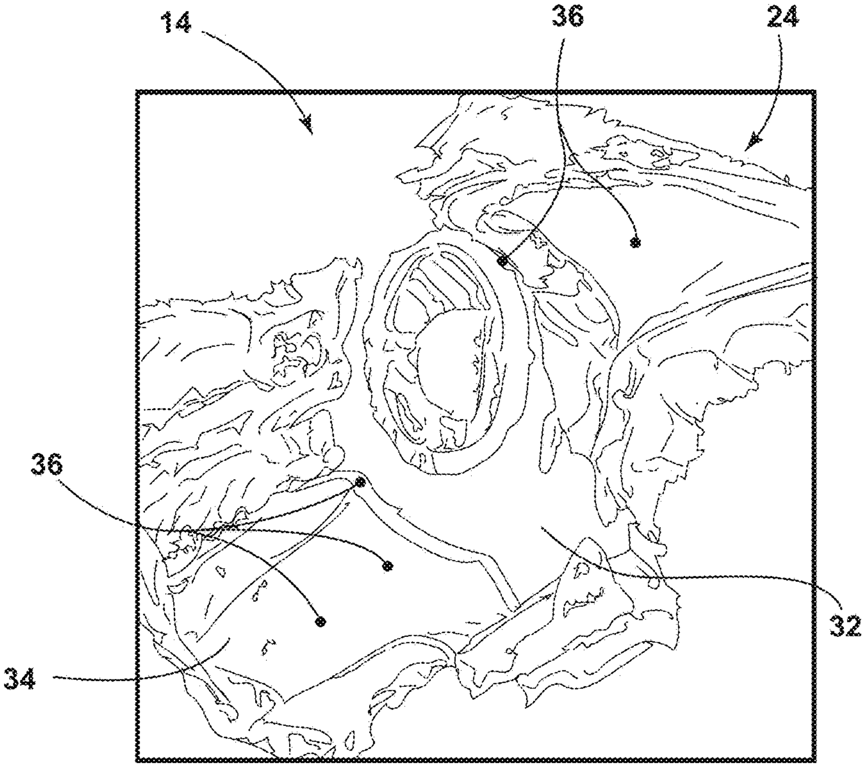
FIG. 2B is a representation of a point cloud generated by a time-of-flight sensor configured to monitor a passenger compartment of a vehicle of the present disclosure.

Referring now to FIGS. 2A and 2B, representations of at least one point cloud 24 generated from the LiDAR modules 22 in the interiors 18 of the vehicles 12 of FIGS. 1A and 1B, respectively, are presented to illustrate the three-dimensional mapping of the present system 10. For example, the depictions of the at least one point cloud 24 may be considered three-dimensional images constructed by the LiDAR modules 22 and/or processors in communication with the LiDAR modules 22. Although the depictions of the at least one point clouds 24 illustrated in FIGS. 2A and 2B may differ in appearance, it is contemplated that such difference may be a result of averaging depths of the points 36 of each point cloud 24 to render a surface (FIG. 2B) as opposed to individual dots (FIG. 2A). The underlying 3D data may be generated the same way in either case.

Still referring to FIGS. 2A and 2B, each point cloud 24 includes the three-dimensional data (e.g., a three-dimensional location relative to the LiDAR module 22) for the various features in the interior 18. For example, the at least one point cloud 24 may generate 3D mapping of the occupants 26 or cargo 37 in the interior 18. The three-dimensional data may include the rectilinear coordinates, with XYZ coordinates, of various points 36 on surfaces or other light-reflective features relative to the LiDAR module 22. It is contemplated that the coordinates of each point 36 may be virtually mapped to an origin point other than the LiDAR module 22, such as a center of mass of the vehicle, a center of volume of the compartment 28 being monitored, or any other feasible origin point. By obtaining the three-dimensional data of the various features in the interior 18 and, in some cases, the region exterior 20 to the vehicle 12, the present system 10 may provide for enhanced monitoring methods to be performed without complex imaging methods, such as those incorporating stereoscopic imagers or other three-dimensional monitoring devices that may require higher computational power or decreased efficiencies.

Figure 3:
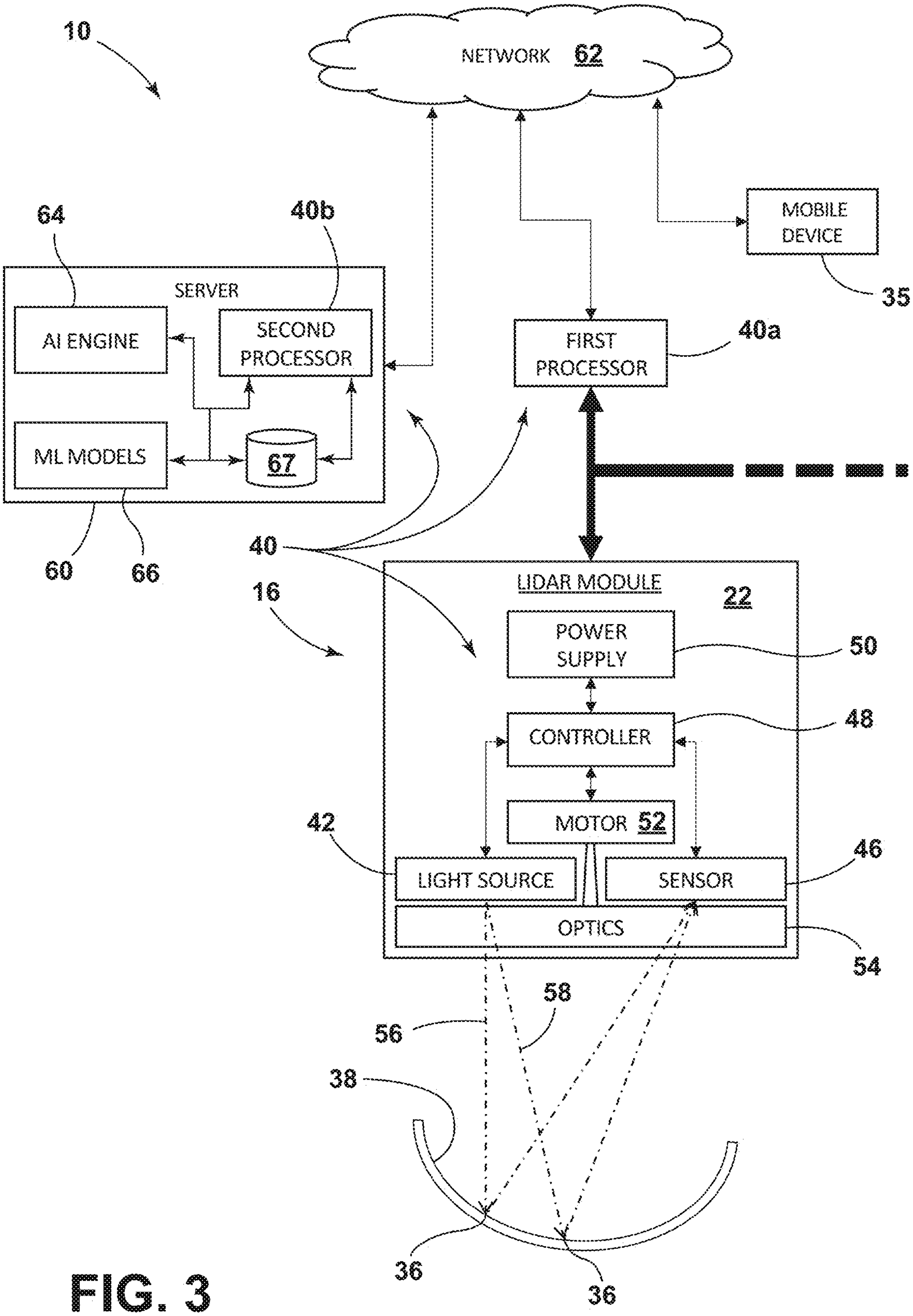
FIG. 3 is a block diagram of an exemplary detection system incorporating light detection and ranging.

Referring now to FIG. 3, at least a portion of the present detection system 10 is exemplarily applied to a target surface 38, such as to the cargo 37 or other surfaces in the environment 14 of the vehicle 12. The system 10 may include processing circuitry 40, which will be further discussed in relation to the proceeding figures, in communication with one or more of the time-of-flight sensors 16. In the present example, the time-of-flight sensors 16 include the LiDAR modules 22 each having a light source 42, or emitter, and a sensor 46 configured to detect reflection of the light emitted by the light source 42 off of the target surface 38. A controller 48 of the LiDAR module 22 is in communication with the light source 42 and the sensor 46 and is configured to monitor the time-of-flight of the light pulses emitted by the light source 42 and returned to the sensor 46. The controller 48 is also in communication with a power supply 50 configured to provide electrical power to the controller 48, the light source 42, the sensor 46, and a motor 52 that is controlled by the controller 48. In the present example, the LiDAR module 22 incorporates optics 54 that are mechanically linked to the motor 52 and are configured to guide the light pulses in a particular direction. For example, the optics 54 may include lenses or mirrors that are configured to change an angle of emission for the light pulses and/or return the light pulses to the sensor 46. For instance, the motor 52 may be configured to rotate a mirror to cause light emitted from the light source 42 to reflect off of the mirror at different angles depending on the rotational position of the motor 52.

In some examples, the optics 54 may include a first portion associated with the source 42 and a second portion associated with the sensor 46. For example, a first lens, which may move in response to the motor 52, may be configured to guide (e.g., collimate, focus) the light emitted by the source 42, and a second lens, which may be driven by a different motor or a different connection to the motor 52, may be configured to guide the light reflected off the target surface 38 and returned to the sensor 46. Accordingly, the general configuration of the LiDAR module 22 may incorporate a single housing having different sets of optics or a plurality of housings with different optics. For example, the source 42 may be located in a first housing of the LiDAR module 22, the sensor 46 may be located in a second housing separate from or spaced from the first housing. In this way, each of the LiDAR modules 22 may refer to any emitter/receiver combination system that emits LiDAR pulses and receives the LiDAR pulses either at a common location in the vehicle 12 or at different locations in the vehicle 12.

The light emitted and received by the present LiDAR modules 22 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR modules 22 may be based on an estimated distance range for capturing the depth information. For example, for shorter ranges (e.g., between 1 m and 5 m) the LiDAR may operate with a greater wavelength of light (e.g., greater than 1000 nm). The LiDAR modules 22 of the present disclosure may be configured to output light, in the form of a laser, at a wavelength of at least 1550 nm while the motor 52 rotates the optics 54 to allow mapping an area. In some examples, the LiDAR modules 22 of the present disclosure are configured to emit light having a wavelength of at least 1650 nm. Due to the relatively short distances scanned by the present LiDAR modules 22 (e.g., between one and five meters), such relatively low infrared (IR) or near-infrared (NIR) may be employed to achieve the three-dimensional spatial mapping via the at least one point cloud 24 with low power requirements. The present LiDAR modules 22 may be either single point-and-reflect modules or may operate in a rotational mode, as described above. In rotational mode, the LiDAR module 22 may measure up to 360 degrees based on the rate of rotation, which may be between 1 and 100 Hertz or may be at least 60 rotations per minute (RPM) in some examples.

In the example depicted in FIG. 3, the time-of-flight for a first pulse of light 56 emitted by the light source 42 and returned to the sensor 46 may be less than a second time-of-flight for a second light pulse emitted by the light source 42 returned to the sensor 46. For example, the first pulse of light 56 may travel a shorter distance than the second pulse of light 58 due to a difference in depth, height, or width of the corresponding reflection point 36 on the target surface 38. In this way, the LiDAR module 22 may generate the at least one point cloud 24 to be representative of the environment 14 (e.g., the target surface 38 in the present example) in three dimensions.

The processing circuitry 40 of the present disclosure may be provided to amalgamate the point cloud 24 from each of a plurality of the LiDAR modules 22 and process the coordinates of the features to determine an identity of the features, as well as to perform other processing techniques that will be further described herein. The processing circuitry 40 may include a first processor 40*a* local to the vehicle 12 and a second processor 40*b* remote from the vehicle 12. Further, the processing circuitry 40 may include the controller 48 of the LiDAR module 22. In some examples, the controller 48 may be configured to generate or determine the at least one point cloud 24 and/or point cloud data, and the first processor 40*a* may be configured to receive the at least one point cloud 24 from each LiDAR module 22 and compile each point cloud 24 of a common scene, such as the environment 14, to generate a more expansive or more accurate point cloud 24 of the environment 14.

The second processor 40*b*, which may be a part of a remote server 60 and in communication with the first processor 40*a*, via a network 62, may be configured to perform various modifications and/or mapping of the at least one point cloud 24 to target three-dimensional image data for the environment 14. For example, the server 60 may include an artificial intelligence (AI) engine 64 configured to train machine learning models 66 based on the point cloud data captured via the LiDAR modules 22 and/or historical data previously captured by the time-of-flight sensors 16. The second processor 40*b* may be in communication with the AI engine 64, as well as in communication with a database 67 configured to store the target point cloud data and/or three-dimensional image information. Accordingly, the server 60 may incorporate a memory storing instructions that, when executed by the processor, causes the processing circuitry 40 to compare the at least one point cloud 24 to point cloud data corresponding to target conditions of the interior 18 and/or the region exterior 20 to the vehicle 12. In this way, the detection system 10 may employ the processing circuitry 40 to perform advanced detection techniques and to communicate with subsystems of the vehicle 12, as will be described in the proceeding figures. In this way, the detection system 10 may be employed in tandem or in conjunction with other operational parameters for the vehicle 12. For example, the detection system 10 may be configured for communicating notifications to the occupants 26 of alert conditions, controlling the various operational parameters in response to actions detected in the interior 18, activating or deactivating various subsystems of the vehicle 12, or interacting with any vehicle systems to effectuate operational adjustments.

Figure 4:
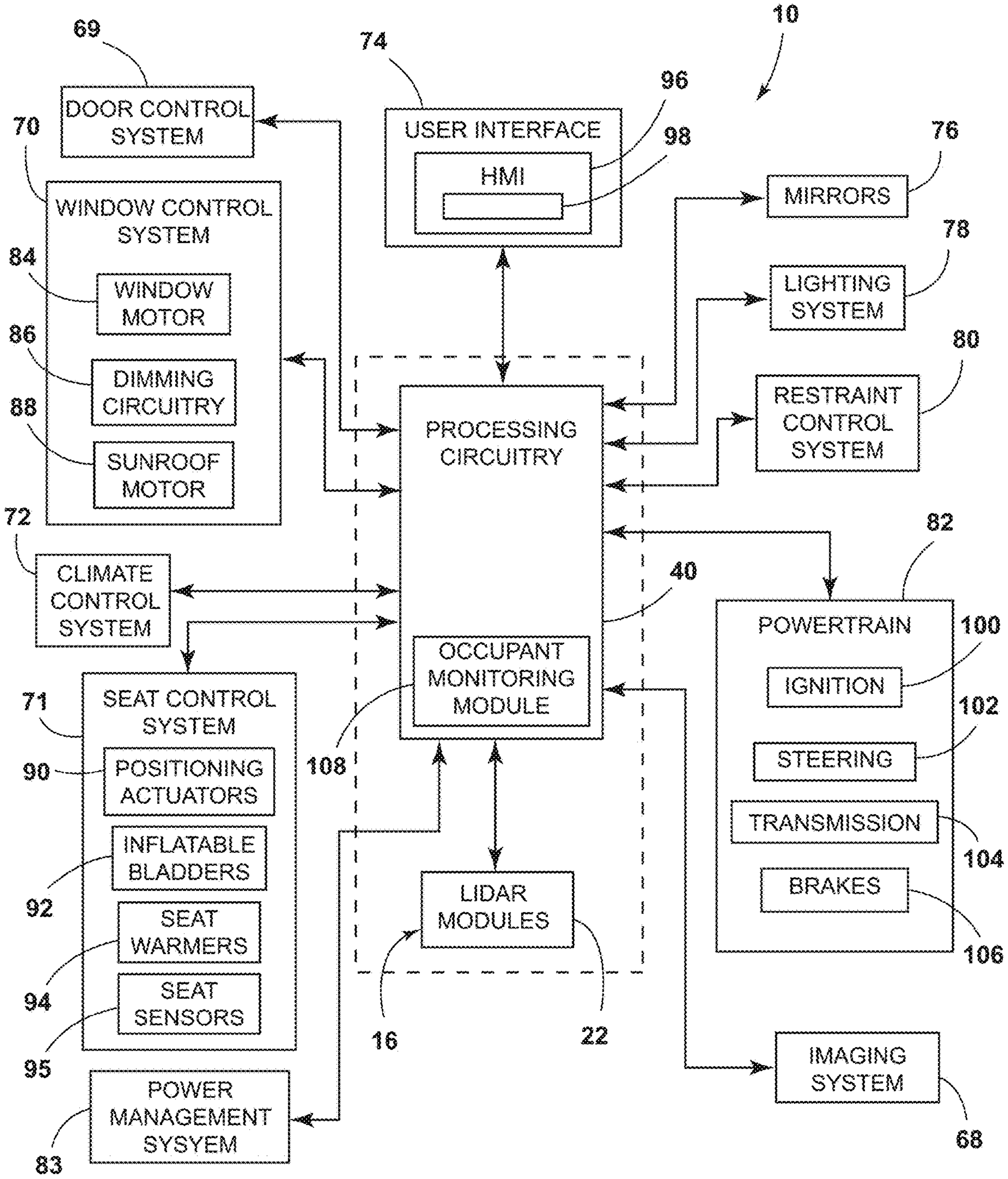
FIG. 4 is a block diagram of an exemplary detection system for a vehicle.

Referring now to FIG. 4, the detection system 10 may incorporate or be in communication with various systems of the vehicle 12 (e.g., vehicle systems). For example, the processing circuitry 40 may be configured to communicate with an imaging system 68 that includes imaging devices, such as cameras (e.g., red-, green-, and blue-pixel (RGB) or IR cameras). The processing circuitry 40 may further be in communication with other vehicle systems, such as a door control system 69, a window control system 70, a seat control system 71, a climate control system 72, a user interface 74, mirrors 76, a lighting system 78, a restraint control system 80, a powertrain 82, a power management system 83, or any other vehicle systems. Communication with the various vehicle systems may allow the processing circuitry 40 to transmit and receive signals or instructions to the various vehicle systems based on processing of the at least one point cloud 24 captured by the time-of-flight sensors 16. For example, when the processing circuitry 40 identifies a number of occupants 26 in the vehicle 12 based on the at least one point cloud 24, the processing circuitry 40 may communicate an instruction to adjust the seat control system 71 when the vehicle 12 is stationary and/or the climate control system 72. In another non-limiting example, the processing circuitry 40 may receive information or signals from the lighting system 78 and control operation of the time-of-flight sensors 16 based on the information from the lighting system 78. Accordingly, the processing circuitry 40 may control, or communicate instructions to control, the time-of-flight sensors 16 based on information from the vehicle systems and/or may communicate signals or instructions to the various vehicle systems based on information received from the time-of-flight sensors 16.

The window control system 70 may include a window motor 84 for controlling a position of a window of the vehicle 12. Further, the window control system 70 may include dimming circuitry 86 for controlling an opacity and/or level of light transmitted between the interior 18 of the vehicle 12 and the region exterior 20 to the vehicle 12. One or more sunroof motors 88 may be provided with the window control system 70 for controlling closing and opening of a sunroof panel. It is contemplated that other devices may be included in the window control system 70, such as window locks, window breakage detection sensors, and other features related to operation of the windows of the vehicle 12. By providing communication between the window control system 70 and processing circuitry 40 of the present disclosure, the window control system 70 may be configured to adjust one or more of its features based on conditions determined or detected by the processing circuitry 40 based on the at least one point cloud 24. Similarly, the window control system 70 may transmit one or more signals to the processing circuitry 40, and the processing circuitry 40 may control operation of the time-of-flight sensors 16 based on the signals from the window control system 70.

The climate control system 72 may include one or more heating and cooling devices, as well as vents configured to distribute heated or cooled air into the interior 18 of the vehicle 12. Although not specifically enumerated in FIG. 4, the climate control system 72 may be configured to actuate a vent to selectively limit and allow heated air or cooled air to circulate in the interior 18 of the vehicle 12. Further, the climate control system 72 may be configured to operate heating, ventilation, and air conditioning (HVAC) systems to recirculate air or to vent air to the region exterior 20 to the vehicle 12.

The seat control system 71 may include various positioning actuators 90, inflatable bladders 92, seat warmers 94, and/or other ergonomic and/or comfort features for seats 34 in the vehicle 12. For example, the seat control system 71 may include motors configured to actuate the seat 34 forward, backward, side to side, or rotationally when the vehicle 12 is stationary. Both a backrest of the seat 34 and a lower portion of the seat 34 may be configured to be adjusted by the positioning actuators 90 when the vehicle 12 is stationary. The inflatable bladders 92 may be provided within the seat 34 to adjust a firmness or softness of the seat 34 when the vehicle 12 is stationary, and seat warmers 94 may be provided for warming cushions in the seat 34 for comfort of the occupants 26. In one non-limiting example, the processing circuitry 40 may compare the position of the seats 34 based on seat sensors 95, such as position sensors, occupancy detection sensors, or other sensors configured to monitor the seats 34, to the point cloud data captured by the time-of-flight sensors 16 in order to verify or check an estimated seat position based on the point cloud data. In other examples, the processing circuitry 40 may communicate one or more signals to the seat control system 71 based on body pose data identified in the at least one point cloud 24 when the vehicle 12 is stationary. In yet further examples, the processing circuitry 40 may be configured to adjust an operational parameter of the time-of-flight sensors 16, such as a scanning direction, a frequency of the LiDAR module 22, or the like, based on the position of the seats 34 being monitored by the time-of-flight sensors 16.

The user interface 74 may include a human-machine interface (HMI) 96 and/or may include audio devices, such as microphones and/or speakers, mechanical actuators, such as knobs, buttons, switches, and/or a touchscreen 98 incorporated with the HMI 96. The human-machine interface 96 may be configured to present various digital objects representing buttons for selection by the user via, for example, the touchscreen 98. In general, the user interface 74 may communicate with the processing circuitry 40 to activate or deactivate the time-of-flight sensors 16, adjust operational parameters of the time-of-flight sensors 16, or control other aspects of the time-of-flight sensors 16. Similarly, the processing circuitry 40 may be configured to communicate instructions to the user interface 74 to present information and/or other data related to the detection and/or processing of the at least one point cloud 24 based on the time-of-flight sensors 16. It is further contemplated that the mobile device 35 may incorporate a user interface 74 to present similar options to the user at the mobile device 35.

Still referring to FIG. 4, other vehicle systems include the mirrors 76, the lighting system 78, and the restraint control system 80. These other vehicle systems may also be adjusted based on the at least one point cloud 24 generated by the time-of-flight sensors 16 and processed by the processing circuitry 40. Additionally, subcomponents of these systems (e.g., sensors, processors) may be configured to send instructions or data to the processing circuitry 40 to cause the processing circuitry 40 to operate the time-of-flight sensors 16 in an adjusted operation. For example, the processing circuitry 40 may be configured to deactivate the time-of-flight sensors 16 in response to the lighting system 78 detecting adequate lighting to allow for visible light and/or IR occupant monitoring. In some examples, the processing circuitry 40 may communicate an instruction to adjust a position of the mirrors 76 based on the at least one point cloud 24. For example, the at least one point cloud 24 may demonstrate an event, such as an orientation of a driver, a position of another vehicle in the region exterior 20 to the vehicle 12, or any other positional feature, and generate a signal to the mirrors 76 (or associated positioning members) to move the mirrors 76 to align a view with the event.

Referring again to FIG. 4, the vehicle 12 may include the powertrain 82 that incorporates an ignition system 100, a steering system 102, a transmission system 104, a brake system 106, and/or any other system configured to drive the motion of the vehicle 12. In some examples, the at least one point cloud 24 captured by the time-of-flight sensors 16 may be processed by the processing circuitry 40 to determine target steering angles, rates of motion or speed changes, or other vehicle operations for the powertrain 82, and communicate the target operations to the powertrain 82 to allow for at least partially autonomous control over the motion of the vehicle 12. Such at least partially autonomous control may include fully autonomous operation or semiautonomous operation of the vehicle 12. For example, the processing circuitry 40 may communicate signals to adjust the brake system 106, the ignition system 100, the transmission system 104, or another system of the powertrain 82 to stop the vehicle 12 or move the vehicle 12.

The processing circuitry 40 may further include an occupant monitoring module 108 that may communicate with any of the vehicle systems described above, as well as the time-of-flight sensors 16 of the present disclosure. The occupant monitoring module 108 may be configured to store various algorithms for detecting aspects related to the occupants 26. For example, the algorithms may be executed to monitor the interior 18 of the vehicle 12 to identify occupants 26 in the vehicle 12, a number of occupants 26, or other occupancy features of the interior 18 using the point cloud data and/or video or image data captured by the imaging system 68. Similarly, various seat sensors 95 of the seat control system 71, heating or cooling sensors that detect manual manipulation of the vents for heating or cooling control for the climate control system 72, inputs to the window control system 70, or any other sensor of the vehicle systems previously described may be processed in the occupant monitoring module 108 to detect positions of occupants 26 in the vehicle 12, conditions of occupants 26 in the vehicle 12, states of occupants 26 in the vehicle 12, or any other relevant occupancy features that will be described herein. The processing circuitry 40 may also include various classification algorithms for classifying objects detected in the interior 18, such as for the cargo 37, mobile devices 35, animals, and any other living or nonliving item in the interior 18. Accordingly, the processing circuitry 40 may be configured to identify an event in the interior 18 or predict an event based on monitoring of the interior 18 by utilizing information from the other vehicle systems.

In general, the detection system 10 may provide for spatial mapping of the environment 14 of the vehicle 12. For example, the LiDAR modules 22 may detect the position, in three-dimensional space, of objects, items, or other features in the interior 18 or the region exterior 20 to the vehicle 12. Such positions, therefore, include depth information of the scene captured by the LiDAR module 22. As compared to a two-dimensional image captured by a camera, the at least one point cloud 24 generated by the time-of-flight sensor 16 allows for more efficient determination of how far the features are from the LiDAR module 22 and from one another. Thus, complex image analysis techniques involving pixel analysis, comparisons of RGB values, or other techniques to estimate depth may be omitted due to utilization of the ToF sensors 16. Further, while multiple imaging devices from different angles of a common scene (e.g., a stereoscopic imager) may allow for more accurate estimation of depth information than those produced by a single camera, complex data processing techniques may be required for multiple cameras to be employed to gather the depth information. Further, such multi-camera systems may require additional weight, packaging volume, or other inefficiencies relative to the time-of-flight sensors 16 of the present disclosure.

Accordingly, the detection system 10 may be computationally-efficient and/or power-efficient relative to two-dimensional and three-dimensional cameras for determining positional information. Further, other time-of-flight sensing techniques, such as RADAR, while providing depth information, may present certification issues based on RF requirements and may be less accurate than the present LiDAR modules 22. Further, a number of cameras used for monitoring the environment 14 may be reduced, various presence detectors (vehicle seat sensors 95) may be omitted, and other sensors configured to determine positional information about the environment 14 may be omitted due to the precision of the LiDAR. Thus, a solution may be provided by the detection system 10 by reducing the number of sensors required to monitor various aspects of the environment 14.

Referring to FIGS. 5-10, the present detection system 10 may be configured to monitor an object 120 in the compartment 28 of the vehicle 12. The detection system 10 may include the time-of-flight sensor 16 previously described, which may be configured to generate the at least one point cloud 24 representing the compartment 28 of the vehicle 12. The at least one point cloud 24 includes three-dimensional positional information of the compartment 28. The detection system 10 may further include the processing circuitry 40 in communication with the time-of-flight sensor 16. A shape of the object 120 may be determined by the processing circuitry 40 based on the at least one point cloud 24. The processing circuitry 40 may further be configured to classify the object 120 as an occupant 26 based on the shape. The processing circuitry 40 may further be configured to identify a body segment 122 of the occupant 26. The processing circuitry 40 may further be configured to compare the body segment 122 to target keypoints corresponding to a target attribute for the body segment 122. The processing circuitry 40 may further be configured to determine a condition of the occupant 26 based on the comparison of the body segment 122 to the target keypoints. The processing circuitry 40 may further be configured to generate an output based on the determined condition.

In some examples, the processing circuitry 40 is further configured to determine whether the occupant 26 has limited movement of the body segment 122. In some examples, the processing circuitry 40 is further configured to capture the at least one point cloud 24 at a plurality of instances 126, 128, compare the plurality of instances 126, 128, and determine six degrees of freedom 130 of the body segment 122 based on the comparison of the plurality of instances 126, 128. In some examples, the processing circuitry 40 is configured to communicate to the window control system 70 of the vehicle 12, a signal to adjust a window 159 to open or close the window 159 based on detection of the condition. In some examples, the detection system 10 further includes the user interface 74 in communication with the processing circuitry 40. The user interface 74 may be configured to present an option 132 to the occupant 26 to select the condition. In some examples, the processing circuitry 40 is configured to adjust the target keypoints based on the option 132 selected at the user interface 74.

In some examples, the processing circuitry 40 is configured to classify the occupant 26 as a human child, a human adult 134, or an animal 136 based on the shape. In some examples, the system 10 includes a body pose database 138 in communication with the processing circuitry 40, and the processing circuitry 40 is configured to determine a pose of the occupant 26 based on the depth information. The processing circuitry 40 is further configured to compare the pose to body pose data stored in the body pose database 138. The processing circuitry 40 is further configured to determine an unfocused state of the occupant 26 based on the comparison of the pose to the body pose data. In some examples, the detection system 10 further comprises an operational system, such as the powertrain 82 previously described or another vehicle system, that is configured to control operations of the vehicle 12. In some examples, the processing circuitry 40 is configured to communicate a signal to the operational system to adjust an operation of the vehicle 12 based on detection of the unfocused state.

It is contemplated that the condition of the occupant 26 may include a state of the occupant 26 or an abnormality of the occupant 26. The abnormality may be a physical abnormality or biological abnormality that results in a limited range of motion, an uncontrolled motion, or a partially-controlled motion of a body segment of the occupant 26. For example, the abnormality may be a neurological condition, a mental condition, a physical handicap, or the like. The state of the occupant 26 may refer to a level of focus, an emotion, or another mental state determined based on physical movements.

Figure 5:
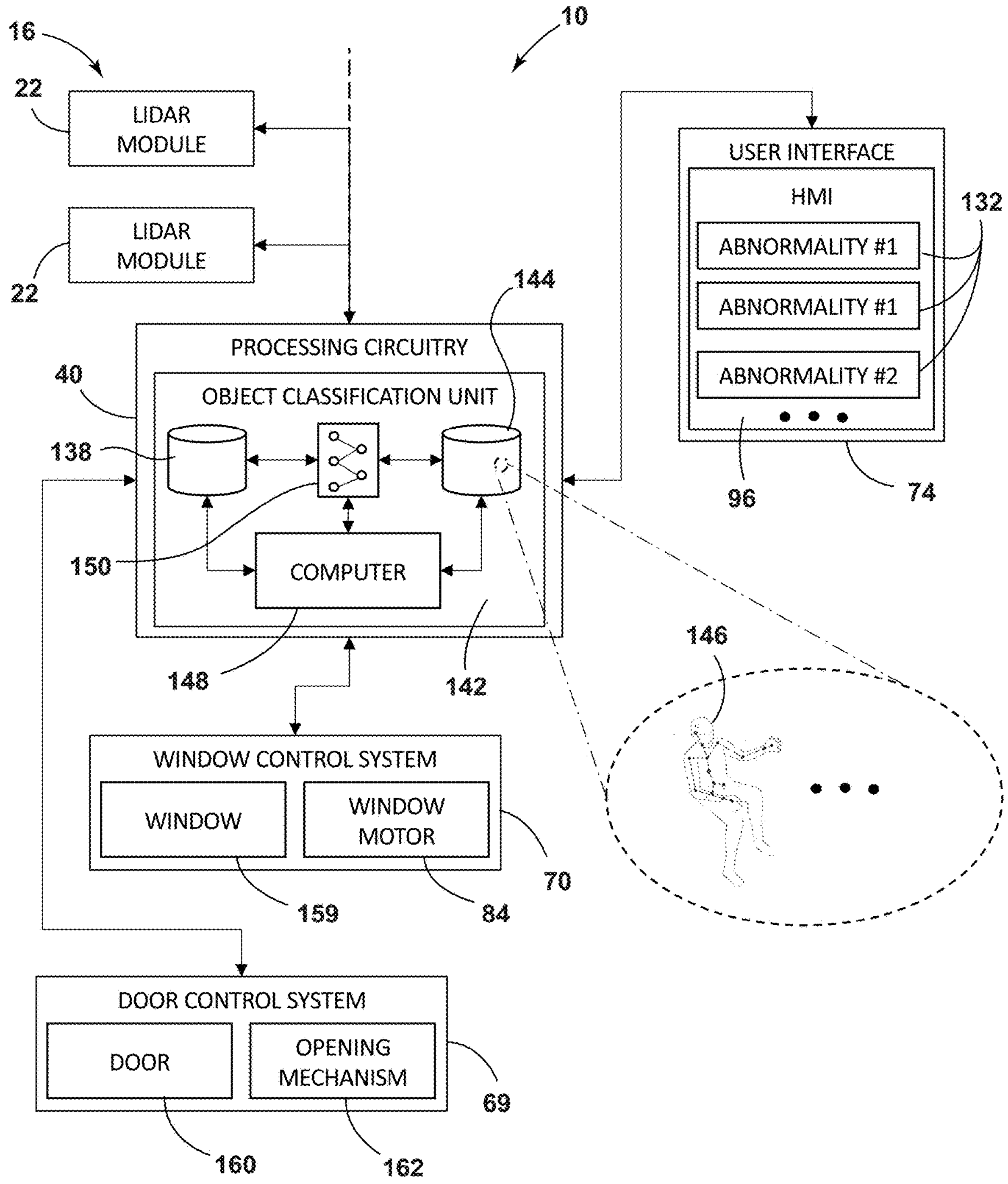
FIG. 5 is a block diagram of an exemplary detection system for a vehicle.

Referring particularly now to FIG. 5, the processing circuitry 40 may be in communication with the window control system 70, as previously described, and the door control system 69. The processing circuitry 40 may further include or be in communication with an object classification unit 142, which may work in tandem with the server 60 previously described or be in communication with the server 60 previously described. The object classification unit 142 may include the body pose database 138 that stores the body pose data and a skeleton model database 144 that stores various skeleton models 146 corresponding to various body shapes, heights, weights, ages, physical abilities, statures, or any combination thereof. It is contemplated that the skeleton model database 144, and the body pose database 138 may be formed of a common database, such as the database 67. In general, the body pose database 138 and the skeleton model database 144 may be configured to store three-dimensional coordinate information corresponding to body parts related to joints (FIG. 6) and/or keyparts of a human body and/or an animal body. For example, the skeleton model 146 may have a plurality of keypoints 124*a-z* corresponding to the poses of occupants 26 of the vehicle 12. Such keypoints 124*a-z* may be correlated to one another in a common skeleton model 146 by a computer 148 of the object classification unit 142 that may employ a similarity measurement algorithm based on the keypoints 124*a-z* and various distances between the keypoints 124*a-z*. An example of a system for generating three-dimensional reference points based on similarity measures of reference points is described in U.S. Patent Application Publication No. 2022/0256123, entitled "Enhanced Sensor Operation," the entire disclosure of which is herein incorporated by reference.

It is contemplated that the object classification unit 142 may include one or more neural networks 150 that are in communication with the body pose database 138, the skeleton model database 144, and the computer 148. It is further contemplated that the skeleton model database 144 and the body pose database 138 may include one or more target point clouds 24 comprising the target keypoints information that correspond to target body pose data. Thus, the at least one point cloud 24 generated by one or more of the LiDAR modules 22 may be processed in the processing circuitry 40 and/or in the object classification unit 142, and the object classification unit 142 may compare the at least one point cloud 24 to the target point clouds data stored in the object classification unit 142 to estimate a pose of the occupant 26 in the vehicle 12 and/or perform various functions described herein related to object classifications. For example, the at least one point cloud 24 captured by the LiDAR modules 22 may be processed in the object classification unit 142 to determine keypoints 124*a-z* of the occupant 26 in the at least one point cloud 24. The keypoints 124*a-z* may be determined based on an output of the computer 148, which may employ the neural networks 150 that are trained to generate the keypoints 124*a-z*. For example, the neural networks 150 may be trained with hundreds, thousands, or millions of shapes of point cloud data representing occupants 26 in various body poses. For example, the processing circuitry 40 may implement various machine learning models 66 that are trained to detect or generate the skeleton model 146 based on an identified body pose.

Following assembly of the keypoints 124*a-z* for the occupant 26 captured in the at least one point cloud 24, the processing circuitry 40 may compare the body pose to body pose data stored in the body pose database 138 to determine the condition, or abnormality, of the occupant 26. For example, the condition may be a physical handicap, a liveliness level, an age, or a physical challenge for the occupant 26, a suboptimal seating position of the occupant 26, or any other abnormality.

Figure 6:
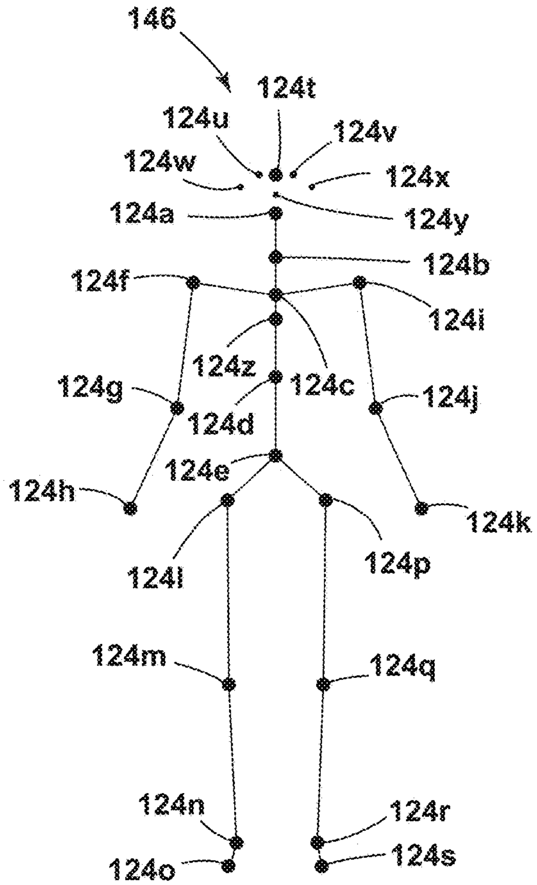
FIG. 6 is a front view of an exemplary skeleton model representing a plurality of keypoints.

With reference to FIGS. 5-9 more generally, the various body segments 122 of the occupant 26 may be identified based on the at least one point cloud 24, and the abnormality may be based on relative positions of the body segments 122. For example, after the keypoints 124*a-z* of the body have been mapped based on the at least one point cloud 24, the pose of the occupant 26 may be estimated by the processing circuitry 40 and compared to the body pose data to determine the condition. For example, as illustrated in FIG. 6, the keypoints 124*a-z* may correspond to various joints or other portions of body segments 122 of the occupant 26, such as the head 122*a*, neck 122*b*, torso 122*c*, arms 122*d*, upper arm 122*e*, forearm 122*f*, shoulders 122*g*, elbows 122*h*, wrists 122*i*, hands 122*j*, legs 122*k*, feet 122*l*, knees 122*m*. It is contemplated that feature points 124*a-z*, which may alternatively be part of the keypoints 124*a-z*, may be estimated based on the estimated positions of the keypoints 124*a-z*. For example, the right elbow keypoint 124*g* may be generated based on identifying an angle between the upper arm 122*e* and the forearm 122*f*, as detected by the at least one point cloud 24. The relative location of the right elbow point 124*g*, the right shoulder point 124*f*, and the left elbow keypoint 124*j* may be compared in the skeleton model database 144 and/or the body pose database 138 to generate the chest centerpoint 124*z*, which may be referred to as the feature point. Thus, the feature points 124*a-z* and/or keypoints 124*a-z* may be generated in the processing circuitry 40 and/or remotely in the server 60, and such keypoints 124*a-z* may be overlaid over the at least one point cloud 24 captured by the LiDAR modules 22, either via interweaving the keypoint data with data representative point cloud 24 or in an image representing the keypoints 124*a-z* overlaying the at least one point cloud 24.

Figure 7:
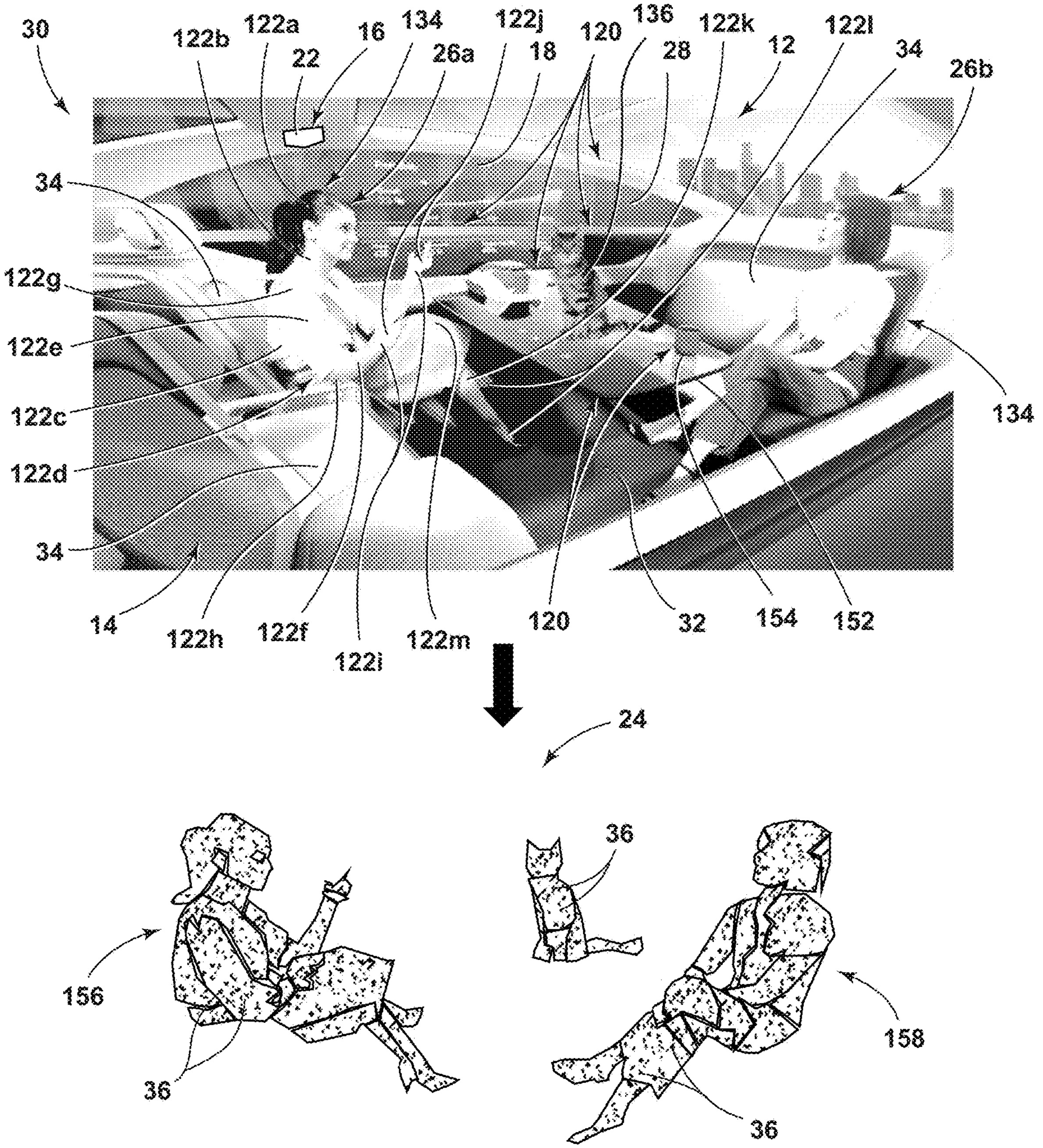
FIG. 7 is a side perspective view of occupants in a vehicle cabin demonstrating generation of at least one point cloud representing the occupants.

For example, with reference now to FIG. 7 more particularly, a view from the perspective of at least one LiDAR module 22 capturing the three-dimensional positional information of the environment 14 is illustrated, along with a representation of the at least one point cloud 24 captured from the perspective of the LiDAR module 22. The environment 14 includes a first occupant 26*a*, a second occupant 26*b*, a table 152, a cup 154, the seats 34, and the animal 136, among other objects in the interior 18. By processing the at least one point cloud 24 in the object classification unit 142, the skeleton models 146 may be applied to the at least one point cloud 24 to identify the occupants 26. For example, an assembly of the keypoints 124*a-z* may be overlaid over the at least one point cloud 24 to determine a correlation of the keypoints 124*a-z* with body segments 122 for the occupants 26, the animal 136, and the other objects. Based on a threshold correlation parameter, the skeleton model 146 may identify a first region 156 in the at least one point cloud 24 and a second region 158 in the at least one point cloud 24, with each corresponding to identification of the first and second occupants 26*a*, 26*b*, respectively. It is also contemplated that, due to the object classification unit 142 also being configured to store keypoints corresponding to other living entities in the environment 14, such as animals 136, the object classification unit 142 may further process the at least one point cloud 24 to determine a third region corresponding to identification of a cat. Other portions of the at least one point cloud 24 corresponding to non-living or non-sentient objects in the vehicle interior 18, such as the table 152, the seats 34, the coffee mug 154, and the like may be differentiated and removed or otherwise omitted from further processing by the processing circuitry 40 to detect the body pose of occupants 26 or animals 136. Accordingly, the regions of the at least one point cloud 24 illustrated in FIG. 7 may correspond to the portions of the at least one point cloud 24 selected for further processing, in the object classification unit 142 of the processing circuitry 40. It is contemplated that the at least one point cloud 24 illustrated in FIG. 7 may be from the perspective shown in the scene depicted in FIG. 7, though the at least one point cloud 24 may include depth information to allow manipulation to different views of the at least one point cloud 24, such as a top-down view, another perspective view, a side view, or the like. Stated differently, points 36 captured from a secondary LiDAR module 22 from another perspective may be combined with the points 36 captured from the exemplary LiDAR module 22 to generate a full 3D rendering of the interior 18, in some examples.

Figure 8:
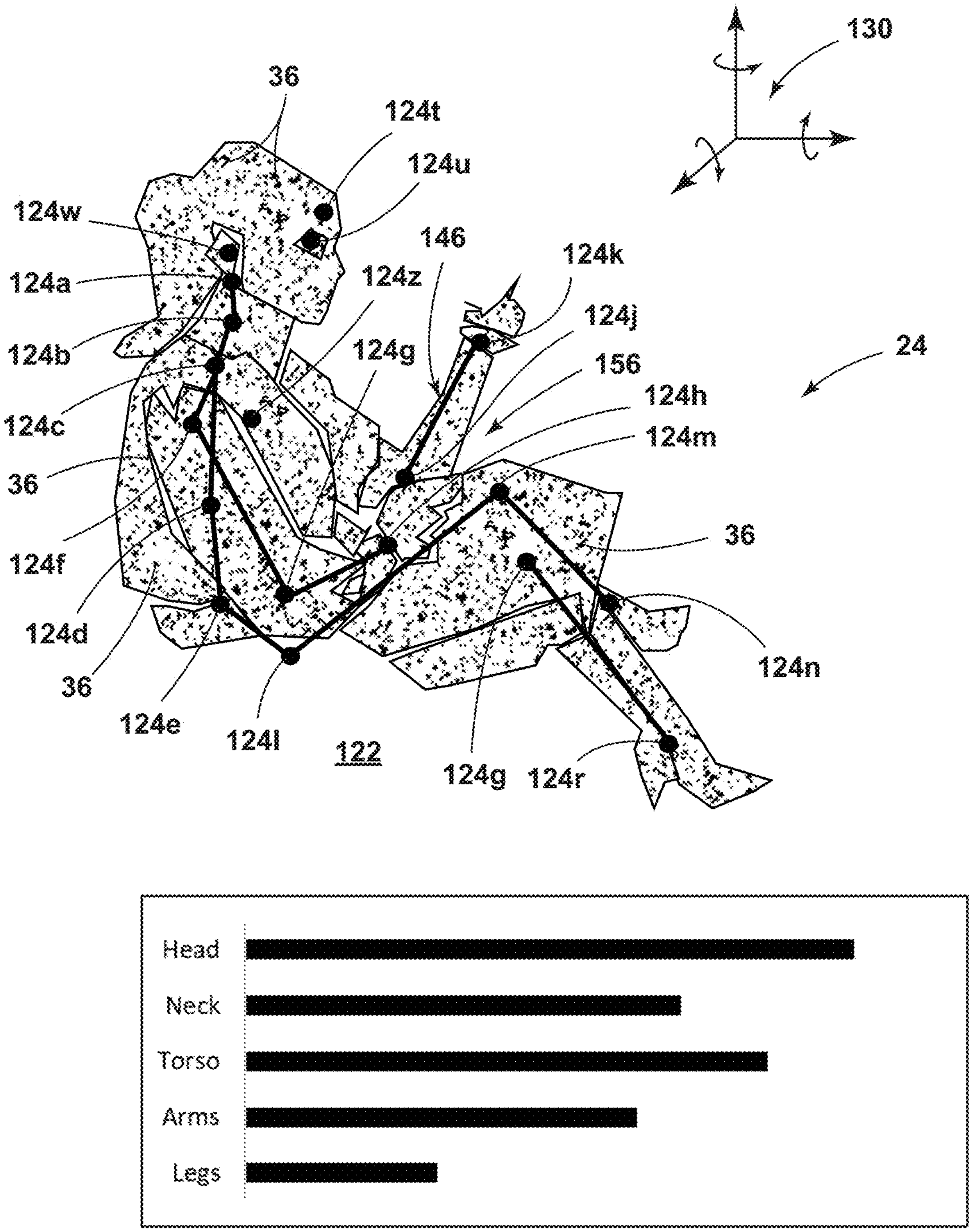
FIG. 8 is a view of the point cloud of one occupant in FIG. 7 having a skeleton model for the one occupant overlaying the point clouds with in a first pose.

Referring now to FIG. 8, an example of a skeleton model 146 correlated with the first region 156 of the at least one point cloud 24 is illustrated. Based on the overlay of the skeleton model 146, the processing circuitry 40 may identify the body segments 122 of the occupant 26 to determine the condition of the occupant 26. It is contemplated that there may be more than one condition of the occupant 26. For example, and as illustrated in FIG. 8, the processing circuitry 40 may be configured to determine various scoring or levels of deviation from the target body pose information stored in the object classification unit 142. In the present example, due to the occupant 26 crossing her legs 122*k*, the resulting body pose estimation and/or skeleton model 146 may result in a reduced correlation to the target body pose information and, as a result, may determine the condition. Accordingly, the abnormality may be general or specific. In the present example, the condition may refer to legs 122*k* and may result in a modification to the monitoring of the environment 14 in order to verify, confirm, or otherwise determine whether the condition could be associated with an alert to be presented at the user interface 74. For example, one or more of the secondary LiDAR modules 22 may be activated to capture or generate the at least one point cloud 24 from other angles of the occupant 26 to confirm the displacement of the right leg of the occupant 26 over the left leg. In general, based on the levels of the correlation of the body segments 122 with the body pose data, the processing circuitry 40 may be configured to determine a posture of the occupant 26. The posture may relate to a general estimation of the overall condition of the living occupant 26. Accordingly, such estimations may be made based on the key features and body pose of the animal 136 or another living occupant 26.

It is contemplated that, based on distances between the various keypoints 124*a-z*, the processing circuitry 40 may estimate the age, stature, weight, height, or other biological markers detectable based on the position according to the skeleton model 146 as applied to the at least one point cloud 24. In this way, the processing circuitry 40 may be configured to detect a child, an elderly person, a handicap of the occupant 26, or another general classification of the occupant 26 in order to cause adjustments to the vehicle systems previously described herein. For example, detection of a small child in a rear seat of the vehicle 12 based on the skeleton model 146 as applied to the at least one point cloud 24, the processing circuitry 40 may communicate an instruction to open or close the window 159 or a door 160 via an opening mechanism 162, such as a motor, actuate the climate control system 72, adjust the powertrain 82, or the like. Thus, operational parameters of the vehicle 12 may be controlled based on classification of the occupant 26 and/or detection of the abnormality. Further, such instructions communicated by the processing circuitry 40 may be based on classification of the object 120 as living or non-living, and, more particularly, as a human adult 134, a human child, or an animal 136.

In some examples, the processing circuitry 40 is configured to control a position of the seat 34 or other settings of the seat 34 associated with the occupant 26 identified in the at least one point cloud 24 when the vehicle 12 is stationary. Accordingly, if a normal setting for the driver for the occupant 26 is known, or an occupant 26 having similar body segment proportions (e.g., an arm length relative to the torso height, a deformity of the occupant 26 relative to other occupants 26 having similar deformities), the processing circuitry 40 may generate an output and communicate an instruction to the seat control system 71 to adjust the seat 34 to a position or parameter consistent with other occupants 26 having a similar abnormality when the vehicle 12 is stationary. For example, if the occupant 26 identified in the at least one point cloud 24 as missing a right arm 122*d*, target body pose data corresponding to other occupants 26 having a missing right arm may be applied, and components of the seat control system 71 may be adjusted to the target position when the vehicle 12 is stationary for occupants 26 missing a right arm 122*d*. It is further contemplated the other vehicle systems may be adjusted based on the detection of the abnormality. However, adjustments made to the seats 34 may only be performed when the vehicle 12 is stationary.

For example, the lighting system 78 may be adjusted in response to occupants 26 having glaucoma or another visual impairment condition that may be detected based on glasses or other optics 54 overlaying the eyes of the occupant 26 as detected based on the at least one point cloud 24. In other examples, the mirrors 76 may be adjusted based on limited movement of the head 122*a* of the occupant 26. For example, the at least one point cloud 24 may be captured over a period of time or a plurality of instances 126, 128, and the processing circuitry 40 may compare the plurality of instances 126, 128 of the at least one point cloud 24 to detect limitations or restrictions within one or more of six degrees of freedom 130 for a joint or other body segment 122. For example, the occupant 26 may have neurological, muscular, or skeleto-muscular abnormalities that limit rotation of the head 122*a* of the occupant 26 about a central axis of the neck 122*b* of the occupant 26. Accordingly, the mirrors 76 for the vehicle 12 (such as a rearview mirror or a side view mirror), may be adjusted to align with the eyes of the occupant 26 as opposed to a more common position for eyes of a driver when turning to look at the rearview mirror or the side view mirror. It is contemplated that other vehicle components not specifically described herein, such as brake pedals, gas pedals, steering wheels, etc. may be adjusted based on detection of such abnormalities described herein.

Accordingly, incorporation of the present LiDAR modules 22 may allow for fine-tuned adjustment to various vehicle components based on detected abnormalities, such as physical abnormalities. By isolating portions of the at least one point cloud 24 to those corresponding to living occupants 26, classifying the occupants 26 based on stature, age, or type of organism, and applying the skeleton model 146, an enhanced experience in the vehicle 12 may be provided. Further, by detecting the abnormalities based on the body segments 122 identified in the at least one point cloud 24 and/or skeleton model 146, various responses specific to the abnormality identified may be effectuated by the detection system 10.

Figure 9:
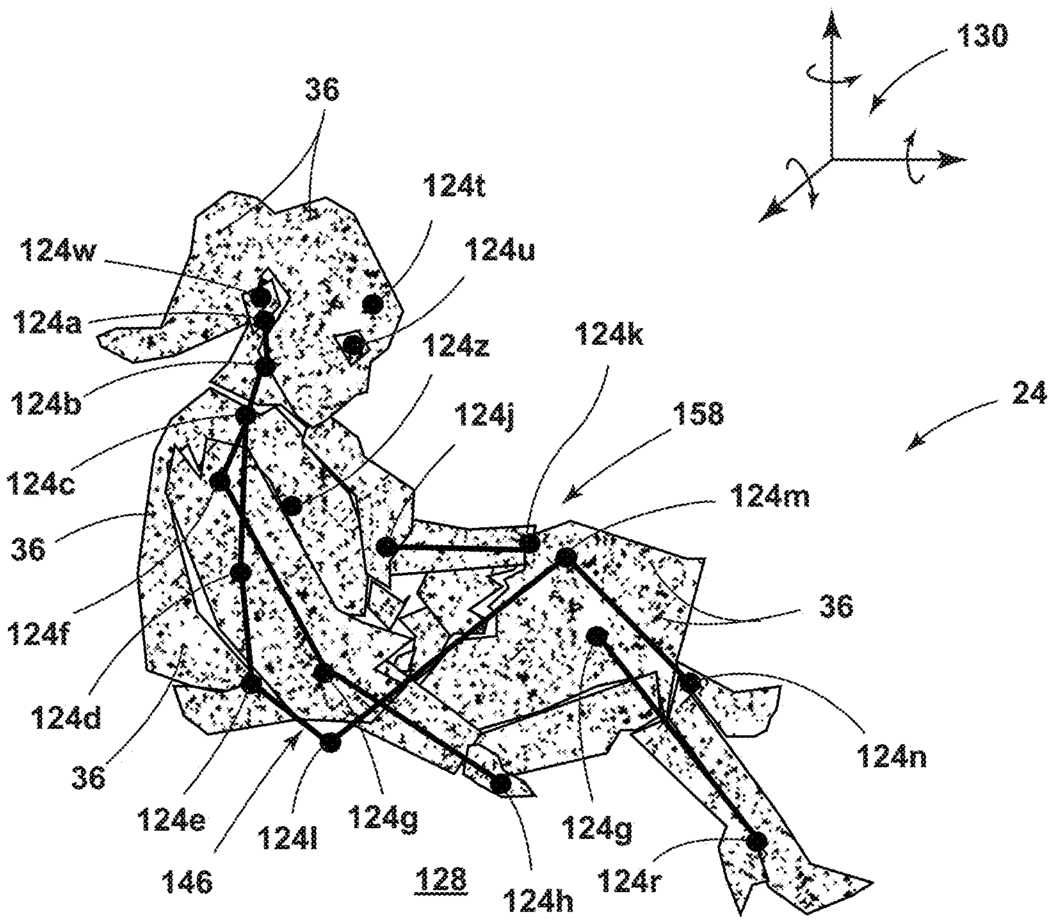
FIG. 9 is a view of the point cloud of one occupant in FIG. 7 having a skeleton model for the one occupant overlaying the point clouds within a second pose.
Figure 9:
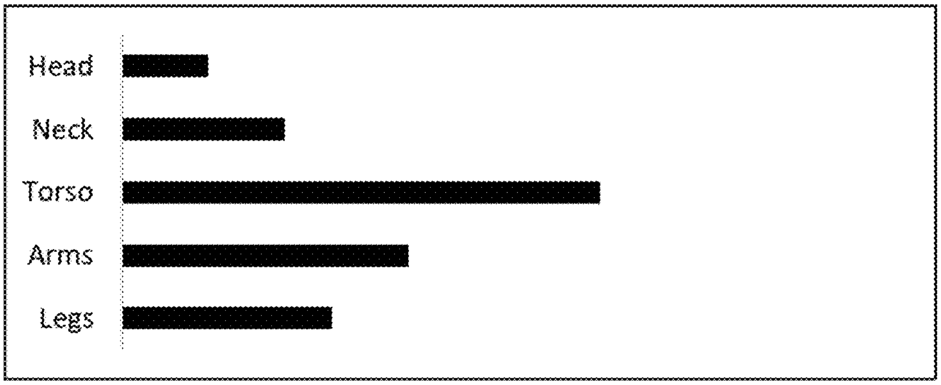

For example, and with reference to FIG. 9, the first region 156 of the at least one point cloud 24 is again depicted at a second instance 128 following the instance 126 illustrated in FIG. 8. In this instance, the head 122*a* of the occupant 26 is tilted downward, and the right arm 122*d* of the occupant 26 has straightened out relative to the instance 126 illustrated in FIG. 8. For example, the right wrist keypoint 122*i* is now at an obtuse angle relative to the upper arm 122*e*. If such changes are detected in a common instance or short period of time (1 second, 5 seconds, 10 seconds, etc.), the processing circuitry 40 may determine the presence of the abnormality or a change in the abnormality. For example, while the abnormality identified in the first instance 126 was related to the occupant's 26 legs 122*k*, an alert level may be less than an alert level response corresponding to the second instance 128 due to the coinciding events of the head 122*a* turning down and the right arm 122*d* straightening out and/or other factors. For example, as depicted, the correlation levels illustrated in FIG. 9 indicate low levels of correlation for the arms 122*d*, head 122*a*, neck 122*b*, and legs 122*k* compared to the target pose. In such an example, the processing circuitry 40 may be configured to determine the alert level to be greater than the alert level identified based on the at least one point cloud 24 of FIG. 8. Accordingly, the processing circuitry 40 may communicate a signal to the user interface 74 and/or communicate an instruction to control the vehicle 12 in response to detection of the second alert level. It is contemplated that other alert levels may result in alternative responses. However, in general, the condition detected in FIG. 9 may continue to be monitored without effectuation of a response to a vehicle system and/or may effectuate a response to a vehicle system depending on a duration for the detected posture.

For example, the posture in FIG. 9 may correspond to an occupant 26 looking down at a tablet or other mobile device 35 on the lap of the occupant 26 or in the hand 122*j* of the occupant 26. Accordingly, the present system may continue to monitor the occupant 26 based on the at least one point cloud 24 and overlaying of the skeleton model 146 and/or may activate or adjust frequencies or scanning rates of one or more of the secondary LiDAR modules 22. In addition, detection of the other occupants 26 in the vehicle 12 (e.g., the second occupant 26*b* of FIG. 7) communicating with the occupant 26 may result in the processing circuitry 40 not communicating an alert.

It is contemplated that relative position of the occupants 26 may further define the particular condition communicated or determined by the processing circuitry 40. For example, if the occupant 26 of which the abnormality applies is a driver of the vehicle 12, adjustments to the vehicle systems, such as the seating (e.g., armrest, backrest, etc.) may be adjusted actively when the vehicle 12 is stationary, whereas classification of the occupant 26 as a non-driver passenger may result in no adjustment to the vehicle systems. For example, responses based on physical abnormalities, such as deformities, missing limbs, limited movement of six degrees of freedom 130, or the like, of the driver may result in adjustments to the vehicle components when the vehicle 12 is stationary, such as the mirrors 76, seating, steering wheel height, brake pedal height, gas pedal height, etc. In one example, the abnormality detected may be a hands-off-the-wheel pose of the driver. For example, the wrist 122*i* may be determined to be away from the steering wheel. Accordingly, the at least one point cloud 24 generated based on the interior 18 may include identification of the steering wheel along with the other objects previously described (e.g., the table 152). In such an example, the alert condition may include an instruction to the driver to put hands 122*j* on the steering wheel and/or may include adjustment of operation of the vehicle 12 from a manual mode to an at least semi-autonomous mode for steering, braking, and other aspects related to the powertrain 82 of the vehicle 12.

It is further contemplated that the shapes generated from the at least one point cloud 24 may be mapped based on the body pose data stored in the body pose database 138 in tandem with or separately from the skeleton model data stored in the skeleton model database 144. Accordingly, the shapes of the at least one point cloud 24 generated may allow the processing circuitry 40 to determine the particular body segment 122 that is being mapped. In this way, the skeleton model database 144 and the body pose database 138 may work together in the processing circuitry 40 to categorize the objects 120 as living and non-living, classify the objects 120 by organism type, detect abnormalities, and determine any of the alert conditions previously described.

Figure 10:
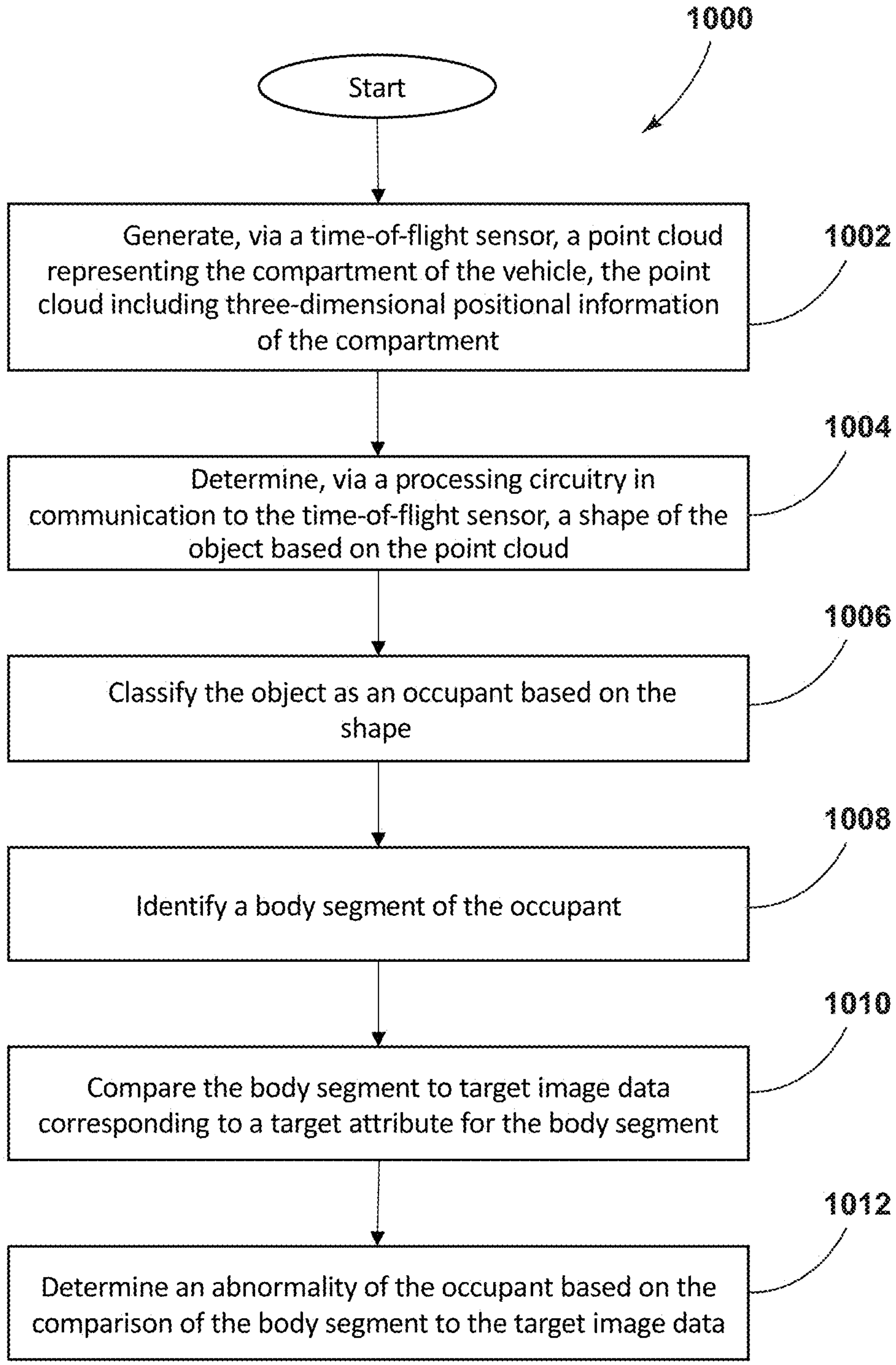
FIG. 10 is a flow diagram of a method for monitoring an object in a compartment of a vehicle using a detection system of the present disclosure.

Referring now to FIG. 10, a method 1000 for monitoring the object 120 in the compartment 28 of the vehicle 12 includes generating, via the time-of-flight sensor 16, the at least one point cloud 24 representing the compartment 28 of the vehicle 12 at step 1002. The at least one point cloud 24 includes three-dimensional positional information of the compartment 28. For example, the time-of-flight sensor 16 may be the LiDAR module 22 previously described.

The method 1000 further includes determining, via the processing circuitry 40 in communication with the time-of-flight sensor 16, the shape of the object 120 based on the at least one point cloud 24 at step 1004. For example, the processing circuitry 40 may utilize the depth information for each point in the at least one point cloud 24 to map the object 120 as tubularly shaped, head shaped, or another shape that may correspond to the body segment 122.

The method 1000 further includes classifying the object 120 as an occupant 26 based on the shape at step 1006. For example, the shape of the at least one point cloud 24, or a region of the at least one point cloud 24 may be a competition of shapes of each body segment 122 of the occupant 26, thereby resulting in a map or assembly of the body segments 122 into a common point cloud 24.

The method 1000 further includes identifying the body segment 122 of the occupant 26 at step 1008. For example, the processing circuitry 40 may employ the skeleton model 146 to correlate the various keypoints with the points 36 in the at least one point cloud 24 to determine joints, or other body segments 122.

The method 1000 further includes comparing the body segment 122 to target keypoints corresponding to a target attribute for the body segment 122 at step 1010. For example, the target attribute may be a universal joint motion, a bending of one body segment 122 to another body segment 122, a rotation of the body segment 122 (e.g., the head 122*a* of the occupant 26 relative to the neck 122*b* of the occupant 26), or any other physiological event that may conventionally be performed by humans. In other examples, the target attribute corresponds to attributes for the animal 136, such as a cat walking on four legs, proper movement of a tail of the animal 136, or any other target attribute for the animal 136.

The method 1000 further includes determining the abnormality of the occupant 26 based on the comparison of the body segment 122 to the target keypoints at step 1012. As previously described, an example of determining the abnormality may be based on a comparison of the skeleton model 146 to projected keypoints 124*a-z* based on the at least one point cloud 24.

In general, the present disclosure may provide for utilization of interior 18 LiDAR sensing integrated into the cabin of the vehicle 12 to detect an abnormal condition and enhance driver state monitoring algorithms for vehicles 12. The present systems and methods may further identify the existence of liveliness occupancy in the cabin, including children, adults, and animals, to enable child and elderly detections. Further, more specific alert conditions and responses may be determined based on the precision of the depth captured in the points 36 of the at least one point cloud 24 generated from the LiDAR modules 22. Further, by continued monitoring by using the at least one point cloud 24 of the cabin, ranges of motion of the body segments 122 may be detected and proper responses may be communicated to the various vehicle systems using the LiDAR modules 22 of the present disclosure. Abnormalities, such as deformities, missing body segments, uncontrolled movements of the body segments 122 (e.g., based on comparison of multiple instances of the at least one point cloud 24), or any other abnormality described herein may be detected and allow for a more specified response than may be achieved by other time-of-flight sensors 16 and/or imagers.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for monitoring an object in a compartment of a vehicle, the method comprising:

positioning a plurality of time-of-flight sensors to monitor the compartment, wherein the plurality of time-of-flight sensors are in communication with each other;

generating, via each of the plurality of time-of-flight sensors, a plurality of point clouds representing the compartment of the vehicle, each of the plurality of point clouds including three-dimensional positional information of the compartment;

comparing the plurality of point clouds generated by each of the plurality of time-of-flight sensors to one another to provide a compared point cloud;

determining, via processing circuitry in communication to the plurality of time-of-flight sensors, a shape of the object based on the compared point cloud;

classifying the object as an occupant based on the shape by using an object classification unit that includes one or more neural networks that are in communication with a body pose database, a skeleton model database, and a computer associated with the processing circuitry, wherein the skeleton model database comprises a plurality of keypoints corresponding to various joints of a skeleton, and wherein the body pose database and the skeleton model database cooperate to provide one or more target point clouds comprising target keypoint information that corresponds to target body pose data, and wherein the one or more neural networks are configured to be trained and applied using point cloud data that includes representations of occupants in a plurality of different body poses;

identifying a body segment of the occupant;

comparing the body segment to target keypoints corresponding to a target attribute for the body segment by having the object classification unit compare the compared point cloud to the one or more target point clouds to estimate a pose of the occupant;

determining a condition of the occupant based on the comparison of the body segment to the target keypoints; and generating an output based on the determined condition.

2. The method of claim 1, wherein each of the plurality of time-of-flight sensors includes a LiDAR module configured to detect light having a wavelength of at least 1500 nm.

3. The method of claim 1, further comprising:

determining whether the occupant has limited movement of the body segment.

4. The method of claim 3, further comprising:

capturing the point cloud of each of the plurality of time-of-flight sensors at a plurality of instances;

comparing the plurality of instances; and determining six degrees of freedom of a movement of the body segment based on the point cloud.

5. The method of claim 4, further comprising:

determining a restriction of at least one of the six degrees of freedom based on the comparison of the plurality of instances.

6. The method of claim 4, further comprising:

communicating, via the processing circuitry to a window control system of the vehicle, a signal to adjust a window to open or close the window based on detection of the condition.

7. The method of claim 1, further comprising:

presenting, at a user interface in communication with the processing circuitry, an option to the occupant to select the condition.

8. The method of claim 7, further comprising:

adjusting the target keypoints based on the option selected.

9. The method of claim 1, further comprising:

classifying, by the processing circuitry, the occupant as a human child, a human adult, or an animal based on the shape.

10. The method of claim 1, further comprising:

determining a pose of the occupant based on the three-dimensional positional information;

comparing, via the processing circuitry, the pose to body pose data stored in a database in communication with the processing circuitry; and determining an unfocused state of the occupant based on the comparison of the pose to the body pose data.

11. The method of claim 10, including a powertrain that is configured to drive a motion of a vehicle, wherein the powertrain includes at least an ignition system, a steering system, a transmission system, and a brake system, further comprising:

processing the point cloud captured by the plurality of time-of-flight sensors to determine target operations including target steering angles, rates of motion, and/or speed changes;

communicating the target operations to the powertrain to allow for at least partially autonomous control over the motion of the vehicle; and communicating, via the processing circuitry to the ignition system, the steering system, the transmission system, and/or the brake system of the vehicle, a signal to adjust an operation of the vehicle based on detection of the unfocused state, wherein adjustment of operation of the vehicle comprises adjusting from a manual mode to an at least semi-autonomous mode.

12. A system for monitoring an object in a compartment of a vehicle, the system comprising:

a plurality of time-of-flight sensors in communication with each other and configured to generate a point cloud representing the compartment of the vehicle, the point cloud including three-dimensional positional information of the compartment;

processing circuitry in communication with the plurality of time-of-flight sensors;

an object classification unit including one or more neural networks that are in communication with a body pose database, a skeleton model database, and a computer associated with the processing circuitry, wherein the skeleton model database comprises a plurality of keypoints corresponding to various joints of a skeleton, and wherein the body pose database and the skeleton model database cooperate to provide one or more target point clouds comprising target keypoint information that corresponds to target body pose data, and wherein the one or more neural networks are configured to be trained and applied using point cloud data that includes representations of occupants in a plurality of different body poses; and the processing circuitry configured to:

compare point clouds generated by each of the plurality of time-of-flight sensors to one another to increase accuracy of the point cloud by having the object classification unit compare the compared point cloud to the one or more target point clouds;

determine a shape of the object based on the three-dimensional positional information;

classify the object as an occupant based on the shape;

estimate a pose of the occupant via comparison of the compared point cloud to the one or more target point clouds; identify a body segment of the occupant;

compare the body segment to target keypoints corresponding to a target attribute for the body segment;

determine a condition of the occupant based on the comparison of the body segment to the target keypoints; and generating an output based on the determined condition.

13. The system of claim 12, where the processing circuitry is further configured to:

determine whether the occupant has limited movement of the body segment.

14. The system of claim 12, where the processing circuitry is further configured to:

capture the point cloud at a plurality of instances;

compare the plurality of instances; and determine six degrees of freedom of a movement of the body segment based on the point cloud.

15. The system of claim 14, including a powertrain that is configured to drive a motion of a vehicle, wherein the powertrain includes at least an ignition system, a steering system, a transmission system, and a brake system, where the processing circuitry is further configured to:

determine a pose of the occupant based on the three-dimensional positional information;

compare the pose to body pose data stored in a database in communication with the processing circuitry;

determining an unfocused state of the occupant based on the comparison of the pose to the body pose data;

process the point cloud captured by the plurality of time-of-flight sensors to determine target operations including target steering angles, rates of motion, and/or speed changes;

communicate the target operations to the powertrain to allow for at least partially autonomous control over the motion of the vehicle; and communicate to the ignition system, the steering system, the transmission system, and/or the brake system, a signal to adjust an operation of the vehicle based on detection of the unfocused state, wherein adjustment of operation of the vehicle comprises adjusting from a manual mode to an at least semi-autonomous mode.

16. A system for monitoring an object in a compartment of a vehicle, the system comprising:

a plurality of LiDAR modules in communication with each other and configured to generate a point cloud representing the compartment of the vehicle, the point cloud including three-dimensional positional information of the compartment;

a powertrain that includes a plurality of powertrain systems that are configured to drive a motion of a vehicle; and processing circuitry in communication with the plurality of LiDAR modules, the processing circuitry configured to:

compare point clouds generated by each of the plurality of LiDAR modules to one another to increase accuracy of the point cloud;

determine a shape of the object based on the three-dimensional positional information;

classify the object as an occupant based on the shape;

identify a body segment of the occupant based on the point cloud;

compare the body segment to target keypoints corresponding to a target attribute for the body segment;

determine a condition of the occupant based on the comparison of the body segment to the target keypoints including determining a pose of the occupant;

determine an unfocused state of the occupant based on a comparison of the pose of the occupant to target keypoints of body pose data;

process the point cloud captured by the plurality of LiDAR modules to determine target operations including target steering angles, rates of motion, and/or speed changes;

communicate the target operations to the powertrain to allow for at least partially autonomous control over the motion of the vehicle; and generate an output based on the determined condition, wherein, based on identification of the unfocused state of the occupant, the output comprises communicating signals to adjust the powertrain to stop the vehicle or move the vehicle via the at least partially autonomous control.

17. The system of claim 16, wherein the processing circuitry is further configured to:

determine whether the occupant has limited movement of the body segment.

18. The system of claim 17, wherein the processing circuitry is further configured to:

capture the point cloud at a plurality of instances;

compare the plurality of instances; and determine six degrees of freedom of a movement of the body segment based on the point cloud.

19. The system of claim 18, wherein the processing circuitry is further configured to:

determine a restriction of at least one of the six degrees of freedom based on the comparison of the plurality of instances.

20. The system of claim 16, wherein the plurality of powertrain systems includes at least an ignition system, a steering system, a transmission system, and a brake system, and further comprising:

the plurality of powertrain systems of the powertrain being in communication with the processing circuitry, wherein the processing circuitry is further configured to communicate the output as a signal to adjust the ignition system, the steering system, the transmission system, and/or the brake system based on detection of the unfocused state of the occupant via the at least partially autonomous control.

21. The system of claim 16, including a mobile device directed from an external location of the vehicle toward the compartment to generate an additional point cloud from a viewing angle different than field-of-views of the plurality of LiDAR modules.

22. The system of claim 16, wherein:

each LIDAR modules comprises a light source, a sensor configured to detect reflection of light emitted by the light source off of a target surface, a controller configured to monitor time-of-flight of light pulses emitted by the light source and returned to the sensor, optics, and one or more motors that control movement of the optics;

the optics comprises lenses or mirrors that are configured to change an angle of emission for the light pulses and/or return the light pulses to the sensor; and the optics includes a first lens or mirror associated with the light source and a second lens or mirror associated with the sensor such that the first lens or mirror is moved by the one or more motors to guide the light emitted by the light source and the second lens or mirror is driven by the one or more motors to guide the light reflected off the target surface and returned to the sensor.

23. The system of claim 12, including a mobile device directed from an external location of the vehicle toward the compartment to generate an additional point cloud from a viewing angle different than field-of-views of the plurality of time-of-flight sensors.

24. The system of claim 12, wherein:

each time-of-flight sensor comprises a light source, a sensor configured to detect reflection of light emitted by the light source off of a target surface, a controller configured to monitor time-of-flight of light pulses emitted by the light source and returned to the sensor, optics, and one or more motors that control movement of the optics;

the optics comprises lenses or mirrors that are configured to change an angle of emission for the light pulses and/or return the light pulses to the sensor; and the optics includes a first lens or mirror associated with the light source and a second lens or mirror associated with the sensor such that the first lens or mirror is moved by the one or more motors to guide the light emitted by the light source and the second lens or mirror is driven by the one or more motors to guide the light reflected off the target surface and returned to the sensor.

25. The method of claim 1, including a mobile device directed from an external location of the vehicle toward the compartment to generate an additional point cloud from a viewing angle different than field-of-views of the plurality of time-of-flight sensors.

26. The method of claim 1, wherein:

each time-of-flight sensor comprises a light source, a sensor configured to detect reflection of light emitted by the light source off of a target surface, a controller configured to monitor time-of-flight of light pulses emitted by the light source and returned to the sensor, optics, and one or more motors that control movement of the optics;

the optics comprises lenses or mirrors that are configured to change an angle of emission for the light pulses and/or return the light pulses to the sensor; and the optics includes a first lens or mirror associated with the light source and a second lens or mirror associated with the sensor such that the first lens or mirror is moved by the one or more motors to guide the light emitted by the light source and the second lens or mirror is driven by the one or more motors to guide the light reflected off the target surface and returned to the sensor.

* * * * *